US011862410B2

(12) United States Patent
Chen et al.

(10) Patent No.: US 11,862,410 B2
(45) **Date of Patent: *Jan. 2, 2024**

(54) KEY STRUCTURE AND KEYBOARD

(71) Applicant: Acer Incorporated, New Taipei (TW)

(72) Inventors: Hung-Chi Chen, New Taipei (TW); Shun-Bin Chen, New Taipei (TW); Huei-Ting Chuang, New Taipei (TW); Wen-Chieh Tai, New Taipei (TW); Yi-Hsin Pan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,586

(22) Filed: Nov. 29, 2022

(65) Prior Publication Data

US 2023/0109039 A1 Apr. 6, 2023

Related U.S. Application Data

(63) Continuation of application No. 16/823,339, filed on Mar. 19, 2020, now Pat. No. 11,551,887.

(30) Foreign Application Priority Data

Nov. 13, 2019 (TW) ................................ 108141205

(51) Int. Cl.
*H01H 13/14* (2006.01)
*H01H 13/70* (2006.01)

(52) U.S. Cl.
CPC ............ *H01H 13/14* (2013.01); *H01H 13/70* (2013.01); *H01H 2233/07* (2013.01); *H01H 2239/022* (2013.01)

(58) Field of Classification Search
CPC .... H01H 13/14; H01H 13/70; H01H 2233/07; H01H 2239/022; H01H 13/705; H01H 2219/004; H01H 2221/066; H01H 3/122; H01H 3/125; H01H 13/7065; H03K 17/968; H03K 17/969; H03K 17/97; H03K 17/972; H03K 2217/9651; H03K 2217/9653
See application file for complete search history.

(56) References Cited

U.S. PATENT DOCUMENTS

| | | | | |
|---|---|---|---|---|
| 11,189,442 B2 * | 11/2021 | Hsieh | ........................ | H01H 3/12 |
| 11,328,879 B2 * | 5/2022 | Hsieh | ...................... | H01H 3/125 |
| 11,551,887 B2 * | 1/2023 | Chen | ..................... | H01H 13/705 |
| 2018/0323024 A1 * | 11/2018 | Yuan | ...................... | H01H 3/125 |

* cited by examiner

*Primary Examiner* — Lheiren Mae A Caroc
(74) *Attorney, Agent, or Firm* — JCIPRNET

(57) ABSTRACT

A key structure including a base, a light sensing module, a carrier, a magnetic member, a cap, and a scissor structure are provided. The light sensing module is disposed at the base. The carrier is located above the base. The magnetic member is disposed on the carrier. The cap is adapted to be assembled to the carrier via a magnetic attracting force of the magnetic member or adapted to be detached from the carrier via overcoming the magnetic attracting force of the magnetic member. The scissor structure is connected between the base and the carrier. The carrier and the cap disposed thereon move up and down relative to the base via the scissor structure. An orthogonal projection of the magnetic member on the base is not overlapped with an orthogonal projection of the light sensing module on the base. A keyboard is also provided.

20 Claims, 7 Drawing Sheets

KEY STRUCTURE AND KEYBOARD

CROSS-REFERENCE TO RELATED APPLICATION

This application is a continuation application of and claims the priority benefit of U.S. patent application Ser. No. 16/823,339, filed on Mar. 19, 2020, now allowed, which claims the priority benefit of Taiwan application serial no. 108141205, filed on Nov. 13, 2019. The entirety of each of the above-mentioned patent applications is hereby incorporated by reference herein and made a part of this specification.

BACKGROUND

Technical Field

The disclosure relates to a key structure and a keyboard.

Description of Related Art

Nowadays, as regards one of the user habits of using electronic apparatuses (such as computers), when a user uses an electronic apparatus, the keyboard is an indispensable input device for inputting characters, symbols or numbers. Recently, as the electronic apparatuses are developed with an aim to achieve miniaturization, keyboard development also aims to achieve light weight, slim design and compact sizes. Nevertheless, each of the existing keyboards has a cap, scissor feet, an elastic member and the like and thus has a certain volume, which is unfavorable for the development trend of miniaturization of the product.

Generally, in the existing keyboards, most of the key structures provide only the turning on and turning off functions. When a key is pressed downward, the switch circuit thereof is turned on to input a corresponding command. When the key is released and rebounded, the switch circuit is turned off and the command is ended. Nevertheless, with rising popularity of e-sports gaming, existing keyboards can no longer meet the needs of e-sports players. For instance, some game programs require the keyboard keys to perform greater continuous control over speed, strength of action, direction, and process of action simultaneously. As such, related keyboards having linear keys are developed. This type of keyboards allow a game program to determine delay time or speed of an output command generated by the game program through the magnitude of force applied on a key, so that the control effect is achieved.

Nevertheless, the user has to change to a corresponding keyboard according to different usage scenarios or objects, which is inconvenient for the user. Therefore, how to improve the scope of application of a keyboard and provide improved convenience is an important issue for people having ordinary skill in the art.

SUMMARY

The disclosure provides a key structure and a keyboard in which a cap may be replaced, and a type of the cap is sensed through a light sensing module.

The disclosure provides a key structure including a base, a light sensing module, a carrier, a magnetic member, and a cap. The light sensing module is disposed at the base. The carrier is located above the base. The magnetic member is disposed on the carrier. The cap is adapted to be assembled to the carrier via a magnetic attracting force of the magnetic member or adapted to be detached from the carrier via overcoming the magnetic attracting force of the magnetic member. The carrier and the cap disposed thereon move up and down relative to the base. An orthogonal projection of the magnetic member on the base is not overlapped with an orthogonal projection of the light sensing module on the base.

The disclosure further provides a keyboard including a base, a light sensing module, a carrier, a magnetic member, a cap, and a control unit. The base has a thin film circuit. The light sensing module is disposed at the base. The carrier is located above the base. The magnetic member is disposed on the carrier. The carrier and the cap disposed thereon move up and down relative to the base. The control unit is electrically connected to the thin film circuit and the light sensing module. After the light sensing module projects light to the cap, the cap projects reflected light to the light sensing module. The cap is adapted to be assembled to the carrier via a magnetic attracting force of the magnetic member or adapted to be detached from the carrier via overcoming the magnetic attracting force of the magnetic member, so that the key structure is suitable for allowing replacement of different caps, and the control unit determines the cap according to the reflected light generated by the cap and received by the light sensing module.

To sum up, through the magnetic member disposed on the carrier of the key structure, the cap may be assembled to the carrier thanks to the magnetic attracting force generated by the magnetic member, or the cap may be detached from the carrier by being applied by an external force and overcoming the magnetic attracting force. Further, the light sensing module is disposed at the base and is configured to provide light to the cap and then receive light reflected from the cap to accordingly determine the type of the cap. In the key structure, the orthogonal projection of the magnetic member on the base is not overlapped with the orthogonal projection of the light sensing module on the base. In this way, the traveling path of the light is unobstructed and is not blocked. Therefore, the control unit of the keyboard may determine the type of the cap according to the reflected light generated by the cap and received by the light sensing module and accordingly provides a key function corresponding to such type.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
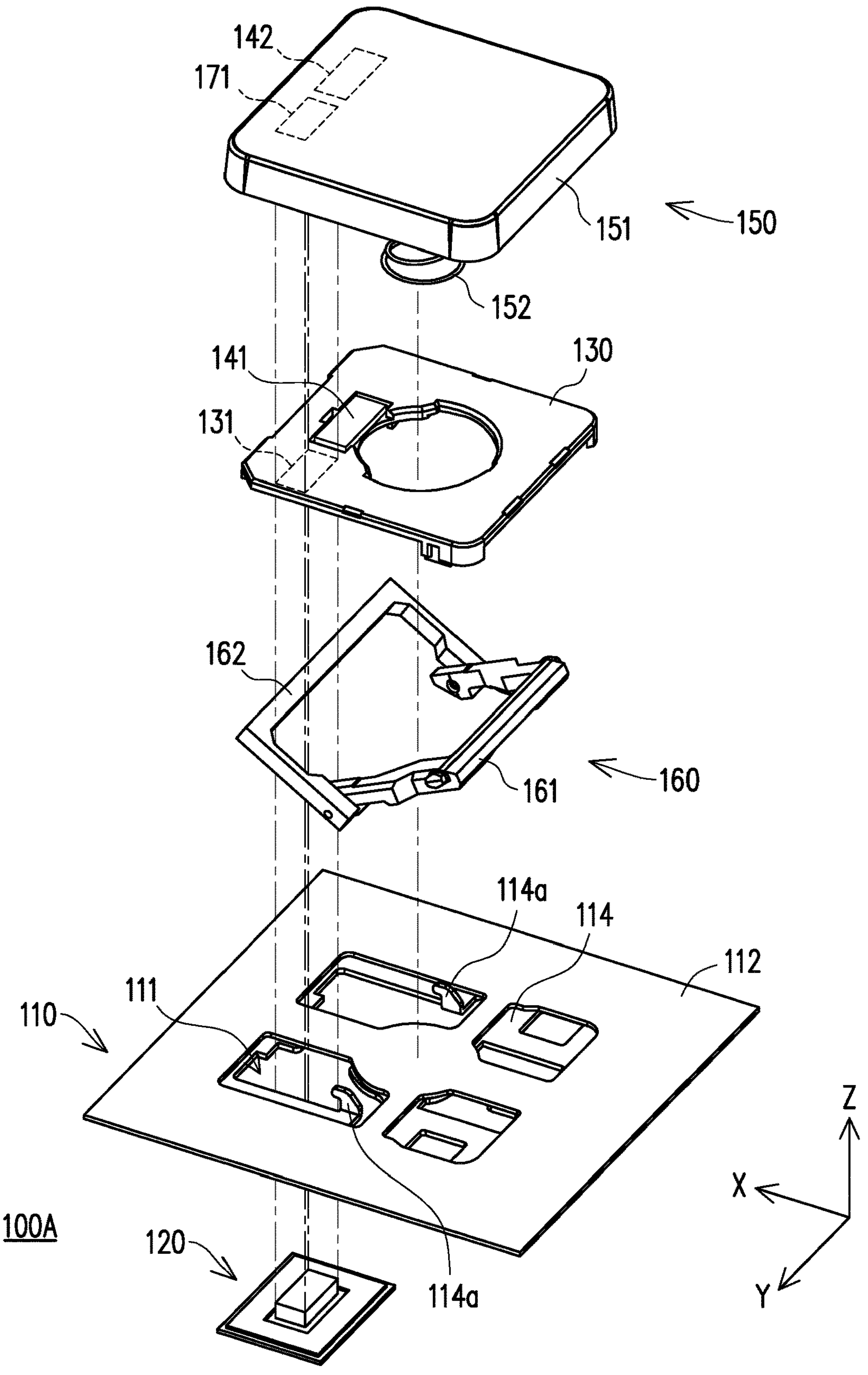
FIG. 1 is an exploded view of a key structure according to an embodiment of the disclosure.
Figure 2:
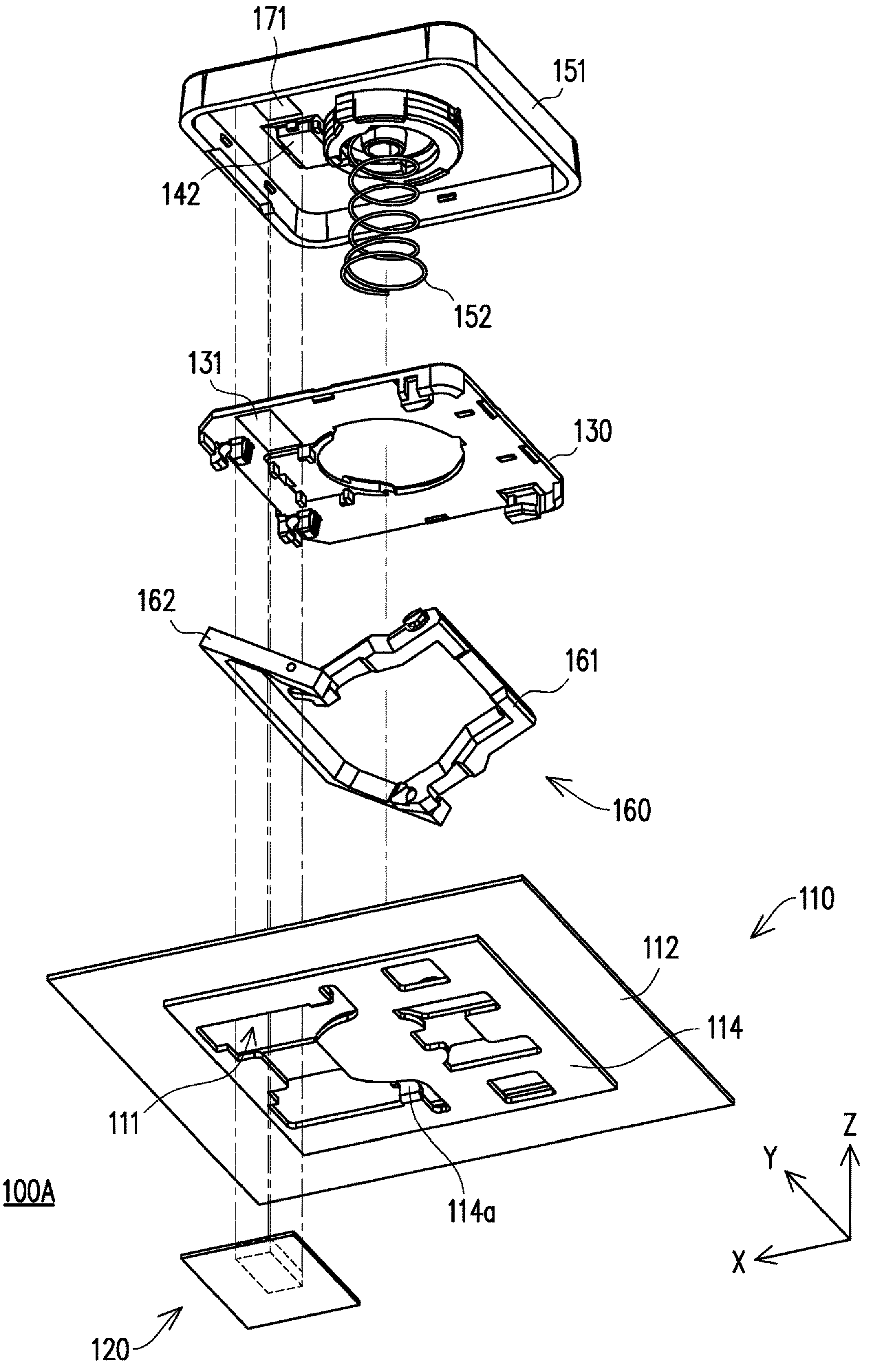
FIG. 2 depicts the key structure of FIG. 1 from another viewing angle.
Figure 3:
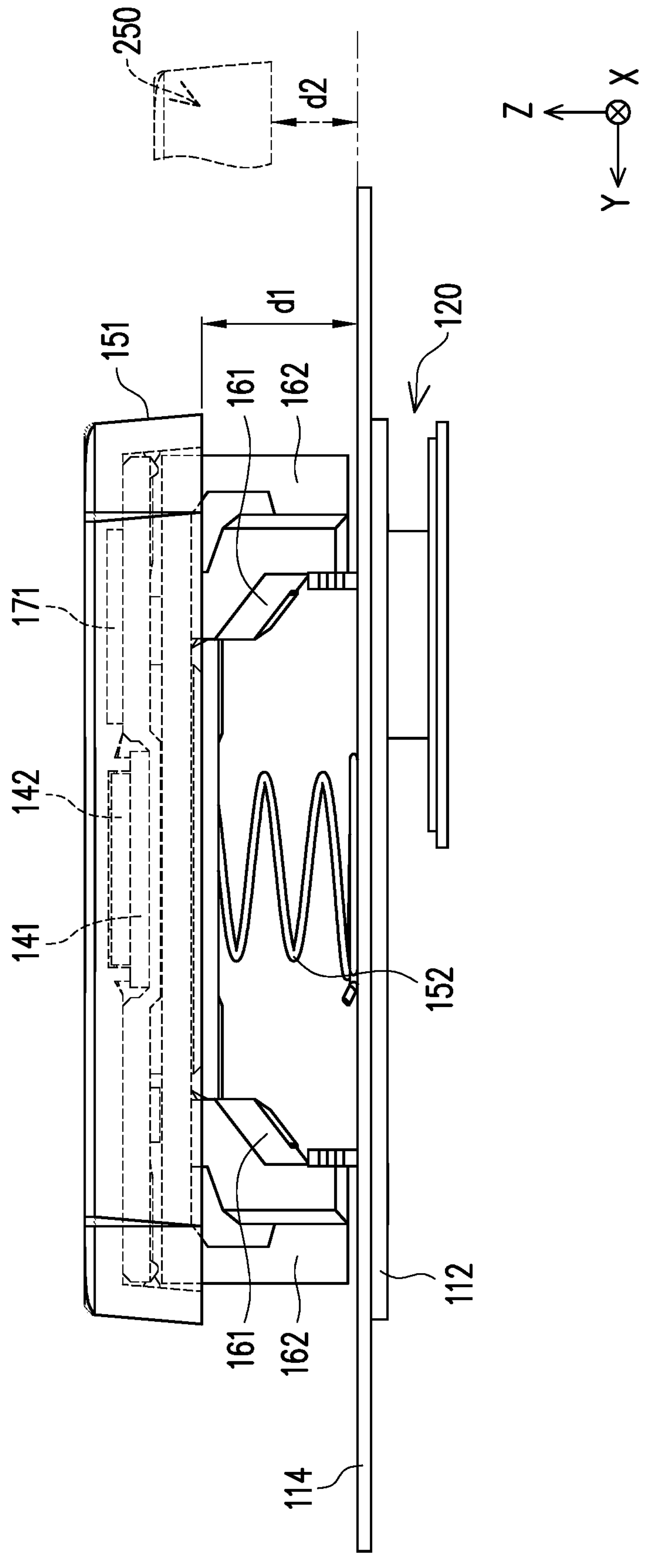
FIG. 3 is a side view of the key structure of FIG. 1 after the key structure is assembled.

FIG. 1 is an exploded view of a key structure according to an embodiment of the disclosure. FIG. 2 depicts the key structure of FIG. 1 from another viewing angle. FIG. 3 is a side view of the key structure of FIG. 1 after the key structure is assembled. With reference to FIG. 1 to FIG. 3 together, in this embodiment, a key structure 100A includes a base 110, a light sensing module 120, a carrier 130, a magnetic member 141, a cap 150, and a scissor structure 160. The base 110 includes a support 114 and a thin film circuit 112 disposed thereon, and the support 114 overlaps the thin film 112 and enables a related engaging part 114*a* to be connected to the scissor structure 160. The light sensing module 120 is disposed below the base 110 and corresponds to an opening 111. The carrier 130 is located above the base 110. The magnetic member 141 is disposed on the carrier 130. The scissor structure 160 is connected (pivotally connected) between the base 110 and the carrier 130. The cap 150 is disposed on the carrier 130. The cap 150 includes a cap body 151 and a spring 152, and the cap body 151 is propped against the thin film circuit 112 through the spring 152. Accordingly, the carrier 130 and the cap 150 disposed thereon may move up and down relative to the base 110 through the scissor structure 160. With reference to FIG. 1, when an external force is applied to the key structure 100A, the cap 150 and the carrier 130 drive the scissor structure 160 to change its state and to move in a negative Z axis direction until the cap 150 activates a switch of the thin film circuit 112. In contrast, when the external force being pressed on the key structure 100A is released, an elastic force that the spring 152 accumulates when pressing is applied may drive the cap 150 and the carrier 130 to move in a positive Z axis direction and may drive the scissor structure 160 to restore an original state and return to an original position. The switch of thin film circuit 112 is turned off as well.

Moreover, in this embodiment, the cap 150 is adapted to be assembled to the carrier 130 through a magnetic attracting force of the magnetic member 141 or is adapted to be detached from the carrier 130 via overcoming the magnetic attracting force of the magnetic member 141. In other words, a user may replace the cap 150 in the key structure 100A of this embodiment, so the key structure 100A may be conveniently used in a different operating environment as required, and related description is provided in a later paragraph in detail. In this embodiment, the key structure 100A further includes a magnetic member 142 disposed on an inner surface of the cap 150 and is located next to a sensing region 171, and a region where the magnetic member 142 is disposed at the cap 150 is required to be misaligned with the sensing region 171 so that the two do not overlap. Herein, the magnetic members 141 and 142 are configured to generate a required magnetic attracting force so that the cap 150 may be securely assembled onto the carrier 130; nevertheless, the embodiment is not intended to limit how the magnetic members are disposed. For instance, in an embodiment that is not shown, only one magnetic member may be provided and is disposed at only one of the cap or the carrier, the other one of the cap and the carrier is made of a material exhibiting magnetic permeability, and the magnetic attracting force which is required during assembly may also be generated in this way.

In this embodiment, after the light sensing module 120 projects light on the sensing region 171 of the cap 150 along a path, the sensing region 171 projects reflected light to the light sensing module 120 along the path. To be specific, the light sensing module 120 of this embodiment includes a light source and a receiver (not shown) and is, for example, a light-emitting diode (LED) or a photodiode (PD). As shown in FIG. 1 and FIG. 2, the dot-dashed lines extending from the light sensing module 120 to the cap 150 are configured to depict paths and ranges of light. The light emitted from the light source of the light sensing module 120 sequentially passes through the opening 111, an internal part of the scissor structure 160, a passing-through region 131 of the carrier 130, and the sensing region 171 on the cap 150. Since the sensing region 171 exhibits certain optical properties and thus reflects the light, the reflected light is transmitted back to the light sensing module 120 along the abovementioned path in an opposite direction, so that the PD may sense the reflected light. Herein, the optical properties include at least one of a pattern or a color level.

Accordingly, in order to ensure that a traveling path of the light or the reflected light is unobstructed and is not blocked, related members along the light path are required to be defined in the key structure 100A of this embodiment. The base 110 has the opening 111 so that the light is allowed to pass through. The carrier 130 is located on the traveling path and cannot be avoided, so the carrier 130 is actually made of a light transmissive material, such as transparent polycarbonate (PC). In this way, at least part (e.g., the passing-through region 131) of or the entire region of the carrier 130 is light transmissive. That is, at least part of the carrier 130 is transparent and is located on the path. Moreover, an orthogonal projection of the magnetic member 141 on the base 110 is not overlapped with an orthogonal projection of the light sensing module 120 on the base 110, so that the magnetic member 141 is not located on the traveling path of the light. That is, the magnetic member 141 located on the carrier 130 is required to be misaligned and not to be overlapped with the passing-through region 131. Similarly, the above restrictions applied to the magnetic member 141 are also applied to the magnetic member 142.

Note that the scissor structure 160 of this embodiment is neither located on the traveling path of the light nor the traveling path of the reflected light, so the scissor structure 160 is prevented from blocking the light or the reflected light. To be specific, the scissor structure 160 includes a first linking member 161 and a second linking member 162 pivotally connected to each other and are both pivotally connected to the engaging part 114*a* of the support 114 of the base 110. Herein, the carrier 130 is pivotally connected to the first linking member 161 and the second linking member 162, and the second linking member 162 has an avoidance space to allow the light or the reflected light to pass through. Specifically, orthogonal projections of the first linking member 161 and the second linking member 162 on the base 110 together form a closed contour, and an orthogonal projection of the avoidance space on the base 110 belongs to one part of the closed contour. That is, as shown in FIG. 1 and FIG. 2, the dot-dashed line representing the traveling path of the light or the reflected light passes through internal ranges of the first linking member 161 and the second linking member 162 and is adjacent to an inner edge space of the second linking member 162.

In the scissor structure 160 of this embodiment, since the light or the reflected light is closer to the second linking member 162 than the first linking member 161, a volume of the second linking member 162 has to be further limited so that the avoidance space may be formed. That is, as the volume of the second linking member 162 is limited, an area of the orthogonal projection of the second linking member 162 on the base 110 is substantially less than an area of the orthogonal projection of the first linking member 161 (not requiring the avoidance space) on the base 110. Accordingly, the second linking member 162 of this embodiment is made of a metal material, and the first linking member 161 is made of a plastic material or made of polyoxymethylene (POM), so that the second linking member 162 may still feature structural strength of a certain degree with a less volume.

A manner of manufacturing the first linking member 161 and the second linking member 162 is not limited herein. Generally, the linking member (e.g., the first linking member 161 but is not limited thereto) not requiring to the avoidance space may feature a larger volume and may be made of a plastic or POM material, and the linking member (e.g., the second linking member 162 but is not limited thereto) in need of the avoidance space may feature a smaller volume but may still be made of a metal material on the premise that the structural strength is required to be maintained. In this regard, insert molding may be adopted for the scissor structure 160 to combine the first linking member 161 with the second linking member 162. Certainly, in another embodiment that is not shown, the first linking member and the second linking member of the scissor structure may both be made of a metal material and may both include avoidance spaces. Accordingly, an assembly direction is not required to be considered when the key structure is assembled, and that assembly may be performed more conveniently.

Figure 4:
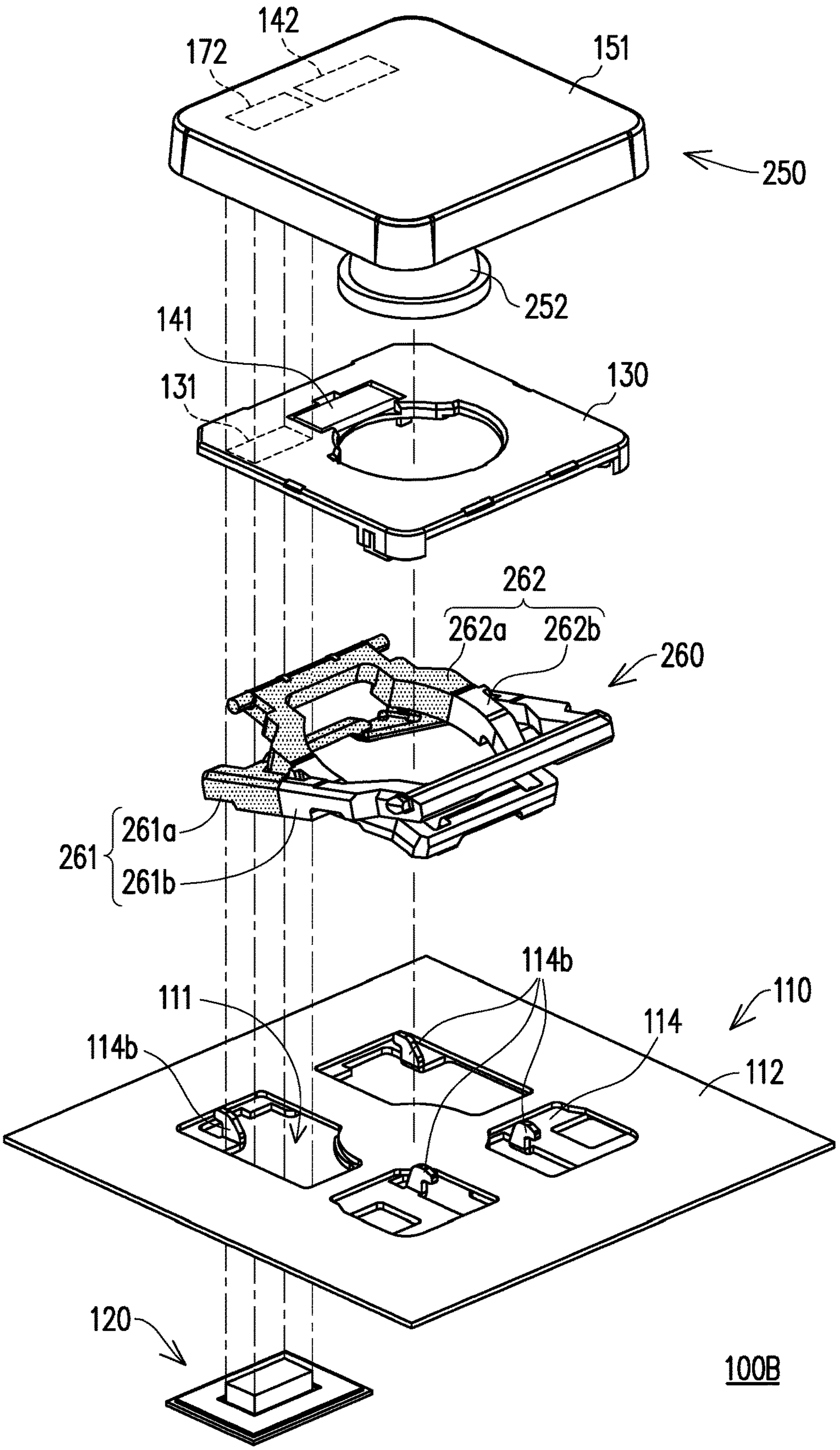
FIG. 4 is an exploded view of a key structure according to another embodiment of the disclosure.

FIG. 4 is an exploded view of a key structure according to another embodiment of the disclosure. With reference to FIG. 4, most of the members of a key structure 100B of this embodiment are identical to the members of the key structure 100A provided in the foregoing embodiments and thus are not described herein. The key structure 100B has a cap 250 and a scissor structure 260 which are different from that of the key structure 100A, and description of the cap 250 is provided in a later paragraph. In this embodiment, the scissor structure 260 is transparent, and a part of the scissor structure 260 is located on the traveling path of the light or the reflected light. To be specific, the scissor structure 260 of this embodiment includes a first linking member 261 and a second linking member 262 pivotally connected to an engaging part 114*b* of the support 114 of the base 110 respectively. Moreover, a part of the first linking member 261 and a part of the second linking member 262 are both transparent and are both located on the traveling path of the light or the reflected light. As shown in FIG. 4, the first linking member 261 has a passing-through part 261*a* and a non-passing-through part 261*b*, and the second linking member 262 has a passing-through part 262*a* and a non-passing through part 262*b*. Herein, the passing-through parts 261*a* and 262*a* are located at a same side, and the non-passing-through parts 261*b* and 262*b* are located at the other opposite side. Herein, each of the first linking member 261 and the second linking member 262 is formed through two-material injection molding, that is, the transparent polycarbonate (PC) is combined with the nontransparent plyoxymethylene (POM). The passing-through parts 261*a* and 262*a* are formed on the transparent PC, and the non-passing-through parts 261*b* and 262*b* are formed on the nontransparent POM. In this way, in each of the first linking member 261 and the second linking member 262, the transparent material is combined with the non-transparent material, and a portion of the transparent material is located on the traveling paths of the light and the reflected light, so that the light or the reflected light may pass through the passing-through parts 261*a* and 262*a*.

In an embodiment that is not shown, the entire scissor structure may be designed to be transparent, so that the assembly direction is not required to be considered during assembly, and that assembly may be performed more conveniently.

Figure 5:
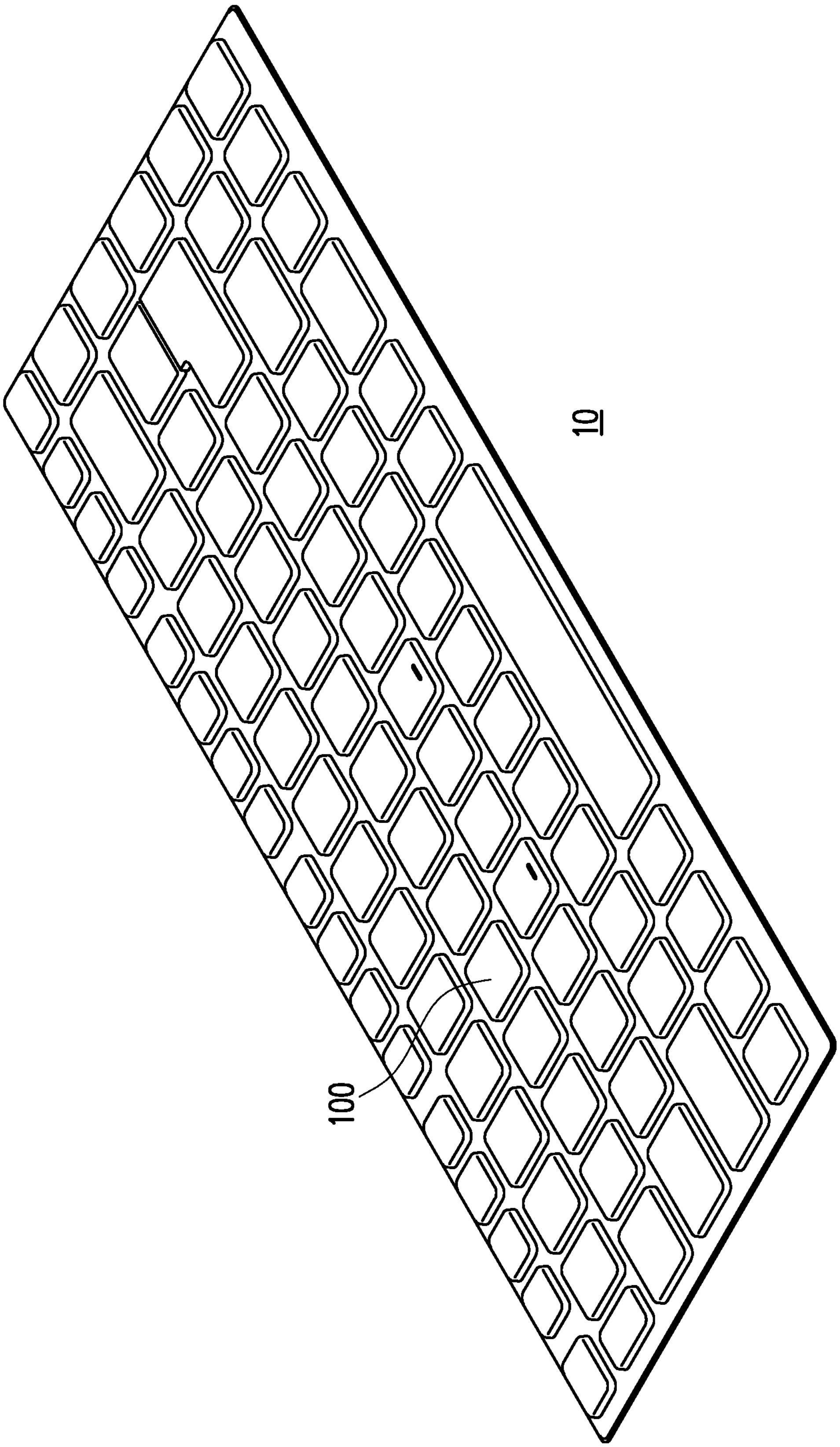
FIG. 5 is a schematic view of a keyboard according to an embodiment of the disclosure.
Figure 6:
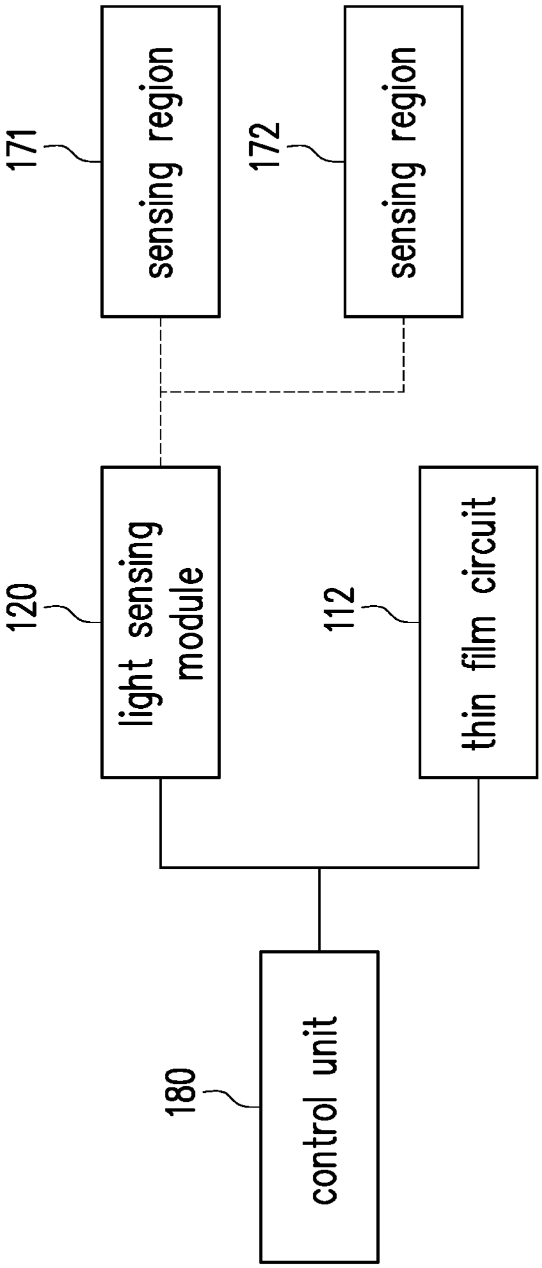
FIG. 6 is a schematic view of electrical connections among part of members of the keyboard of FIG. 5.
Figure 7:
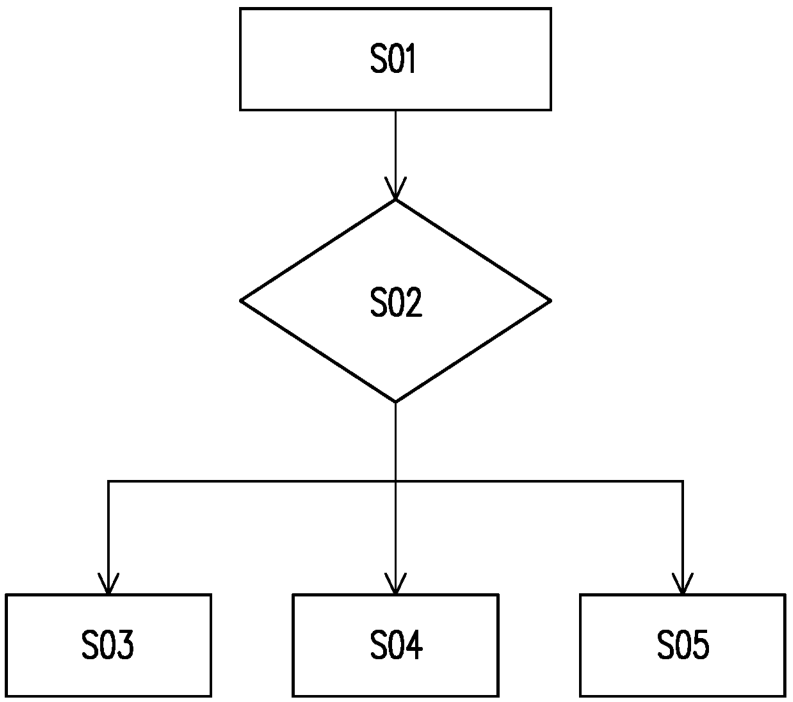
FIG. 7 is a flow chart of cap replacement in a keyboard according to an embodiment of the disclosure.

FIG. 5 is a schematic view of a keyboard according to an embodiment of the disclosure. FIG. 6 is a schematic view of electrical connections among part of members of the keyboard of FIG. 5. FIG. 7 is a flow chart of cap replacement in a keyboard according to an embodiment of the disclosure. As described in the foregoing embodiments, types of the caps 150 and 250 of the key structure 100A and the key structure 100B are different, so that the user may perform replacement for different usage scenarios. Herein, in a keyboard 10 of this embodiment, when the user intends to replace a key structure 100, the keyboard 10 may accordingly determine a type of a cap and thus provides a corresponding function command in the following operations.

Specifically, the keyboard 10 of this embodiment further includes a control unit 180 electrically connected to the thin film circuit 112 and the light sensing module 120 of the key structure 100, and the key structure 100 provided herein is similar to the key structure 100A or the key structure 100B as described above.

Note that as described above, the key structure 100A differs from the key structure 100B in the cap 150 and the cap 250. The cap 150 includes the cap body 151 and the spring 152 (e.g., a linear spring), and a linear key structure is thereby formed. In the linear key structure provided herein, the key structure 100A may continuous control speed, strength of action, direction, and process of action along with different degrees of pressing applied to the cap 150. From another perspective, the cap 250 includes the cap body 151 and a rubber dome 252, and the key structure 100B formed by the cap 250 and other members belongs to a standard key structure, that is, a simple command of turning on/off is provided only. Since the cap 150 and the cap 250 are both assembled to the carrier 130 through a magnetic attracting force, the user may replace the cap 150 or the cap 250 any time as required.

Accordingly, when step S01 is performed by the user, a cap is replaced (for example, the cap 150 and the cap 250 may be replaced with each other). Next, in step S02, as the caps 150 and 250 are different in types, optical properties of the sensing regions 171 and 172 are different. For instance, different patterns or different color levels are provided, and different sensing results are therefore produced after the light sensing module 120 senses the reflected light. As such, the control unit 180 may determine the type of a cap (the cap 150 or the cap 250) according to the reflected light generated by the cap (e.g., the cap 150 or the cap 250) and received by the light sensing module 120.

In addition, with reference to FIG. 3 again, at the right side of the figure, the cap 250 of FIG. 4 is depicted, so that comparison may be conveniently made. In this embodiment, the control unit 180 determines the type of the cap according to the optical properties of the reflected light. The optical properties provided herein are properties presented within a period of time after the light sensing module 120 emits light which is projected to the cap 150 or 250 and receives the reflected light, and that a height of the cap 150 or the cap 250 relative to the base 110 is accordingly determined. As shown in FIG. 3, the cap body 151 of the cap 150 of the key structure 100A has a height d1 relative to the thin film circuit 112 of the base 110. When the key 250 of the key structure 100B is used for replacement, it can be seen that the key 250 has a height d2 relative to the thin film circuit 112, and the height d2 is less than the height d1.

For instance, when the control unit 180 accordingly determines that the key structure 100A is provided, step S03 is performed. The control unit 180 keeps the light sensing module 120 activated, and that the light sensing module 120 continuously senses the cap 150. As such, the control unit 180 accordingly determines pressing applied to the cap 150 or a position of the cap 150 relative to the base 110. In this way, the control unit 180 accordingly drives the thin film circuit 112 to provide a corresponding command, and that an effect produced by the linear key structure is achieved. When the control unit 180 accordingly determines that the key structure 100B is provided, step S04 is performed. That is, the control unit 180 turns off the light sensing module 120 since the key structure 100B at this time requires only a command corresponding to turning on/off. In addition, when the control unit 180 cannot accordingly determine which key structure is provided, it means that a cap is not assembled to the carrier or other assembly errors may exist. At this time, step S05 is performed, and the control unit 180 sends a warning message to the user through a warning unit and waits for confirmation of a state of the key structure performed by the user.

In view of the foregoing, in the embodiments of the disclosure, through the magnetic member disposed on the carrier of the key structure, the cap may be assembled to the carrier thanks to the magnetic attracting force generated by the magnetic member, or the cap may be detached from the carrier by being applied by an external force and overcoming the magnetic attracting force. Further, the light sensing module is disposed at the base and is configured to provide light to the cap and then receive light reflected from the cap, so as to accordingly determine the type of the cap and further drive the thin film circuit to provide a corresponding command to the key structure.

Further, in the key structure provided by the embodiments, the orthogonal projection of the magnetic member on the base is not overlapped with the orthogonal projection of the light sensing module on the base, and in this way, the traveling path of the light is unobstructed and is not blocked. In addition, each of the related members on the traveling path of the light or the reflected light is required to have a small volume or is required to be made of a transparent material so that the light (or the reflected light) may pass through easily, and that the sensing process of the light sensing module may thereby be smoothly performed. The scissor structure may be designed to have a small volume according to needs but may be made of a metal material so that structural strength of the scissor structure is ensured. In addition, two-plastic material injection may be adopted for the scissor structure, so that each of the first linking member and the second linking member has both the passing-through region and the non-passing-through region.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A key structure, comprising:

a base;

a light sensing module, disposed at the base;

a carrier, located above the base;

a magnetic member, disposed on the carrier; and a cap, adapted to be assembled to the carrier via a magnetic attracting force of the magnetic member or adapted to be detached from the carrier via overcoming the magnetic attracting force of the magnetic member, wherein the carrier and the cap move up and down relative to the base, wherein an orthogonal projection of the magnetic member on the base is not overlapped with an orthogonal projection of the light sensing module on the base.

2. The key structure as claimed in claim 1, wherein after the light sensing module projects light on a sensing region of the cap along a path, the sensing region projects reflected light to the light sensing module along the path.

3. The key structure as claimed in claim 2, wherein at least a part of the carrier is transparent and is located on the path, and the magnetic member is not located on the path.

4. The key structure as claimed in claim 2, wherein a scissor structure is connected between the base and the carrier, the carrier and the cap disposed thereon move up and down relative to the base via the scissor structure, and the scissor structure is not located on the path.

5. The key structure as claimed in claim 4, wherein the scissor structure comprises a first linking member and a second linking member pivotally connected to each other and pivotally connected to the base, the carrier is pivotally connected to the first linking member and the second linking member, and the second linking member has an avoidance space to allow the light or the reflected light to pass through.

6. The key structure as claimed in claim 5, wherein orthogonal projections of the first linking member and the second linking member on the base form a closed contour, and an orthogonal projection of the avoidance space on the base belongs to a portion of the closed contour.

7. The key structure as claimed in claim 5, wherein a material of the second linking member is metal, and a material of the first linking member is plastic.

8. The key structure as claimed in claim 2, wherein a scissor structure is connected between the base and the carrier, the carrier and the cap disposed thereon move up and down relative to the base via the scissor structure, the scissor structure is transparent, and a part of the scissor structure is located on the path.

9. The key structure as claimed in claim 8, wherein the scissor structure comprises a first linking member and a second linking member pivotally connected to the base respectively, and a part of the first linking member and a part of the second linking member are transparent and are both located on the path.

10. The key structure as claimed in claim 9, wherein in each of the first linking member and the second linking member, a transparent material is combined with and a non-transparent material, and a portion of the transparent material is located on the path.

11. The key structure as claimed in claim 2, wherein the key structure is suitable for allowing replacement of different caps, and the different caps respectively have sensing regions exhibiting different optical properties.

12. The key structure as claimed in claim 11, wherein the optical properties comprise a pattern or a color level.

13. The key structure as claimed in claim 2, further comprising another magnetic member disposed at the cap and corresponding to the magnetic member located on the carrier, wherein a location of the another magnetic member at the cap is different from a location of the sensing region, and the another magnetic member is not located on the path.

14. A keyboard, comprising:
a base, having a thin film circuit;
a light sensing module, disposed at the base;
a carrier, located above the base;
a magnetic member, disposed on the carrier;
a cap; and
a control unit, electrically connected to the thin film circuit and the light sensing module,
wherein the carrier and the cap move up and down relative to the base,
wherein after the light sensing module projects light to the cap, the cap projects reflected light to the light sensing module,
wherein the cap is adapted to be assembled to the carrier via a magnetic attracting force of the magnetic member or adapted to be detached from the carrier via overcoming the magnetic attracting force of the magnetic member, so that the key structure is suitable for allowing replacement of different caps, and the control unit determines the cap according to the reflected light generated by the cap and received by the light sensing module.

15. The keyboard as claimed in claim 14, wherein after the light sensing module projects light on a sensing region of the cap along a path, the sensing region projects reflected light to the light sensing module along the path, and the sensing regions of the different caps respectively have different patterns or color levels.

16. The keyboard as claimed in claim 15, wherein at least a part of the carrier is located on the path and is transparent, and the magnetic member is not located on the path.

17. The keyboard as claimed in claim 15, wherein a scissor structure is connected between the base and the carrier, the carrier and the cap disposed thereon move up and down relative to the base via the scissor structure, the scissor structure comprises a first linking member and a second linking member pivotally connected to each other and pivotally connected to the base, the carrier is pivotally connected to the first linking member and the second linking member, and the first linking member has an avoidance space to allow the light or the reflected light to pass through.

18. The keyboard as claimed in claim 17, wherein a material of the first linking member is metal, and a material of the second linking member is plastic.

19. The keyboard as claimed in claim 15, wherein a scissor structure is connected between the base and the carrier, the carrier and the cap disposed thereon move up and down relative to the base via the scissor structure, the scissor structure comprises a first linking member and a second linking member pivotally connected to the base respectively, and a part of the first linking member and a part of the second linking member are transparent and are both located on the path.

20. The keyboard as claimed in claim 19, wherein a material of the first linking member and a material of the second linking member are plastic.

* * * * *